April 8, 1941.  G. M. CROFT  2,237,417
METHOD OF REMOVING DEPOSITS FROM FILTERS
Filed Sept. 8, 1938

INVENTOR
George M. Croft
by his attorneys
Stebbins, Blenko & Parmelee

Patented Apr. 8, 1941

2,237,417

UNITED STATES PATENT OFFICE 2,237,417

METHOD OF REMOVING DEPOSITS FROM FILTERS

George M. Croft, Pittsburgh, Pa., assignor to Blaw-Knox Company, Pittsburgh, Pa., a corporation of New Jersey Application September 8, 1938, Serial No. 228,958

5 Claims. (Cl. 183—52)

This invention relates to the removal from a filter of material deposited thereon from a fluid stream traversing the filter.

In certain metallurgical operations, such as the reduction of ores, it is the practice to filter the fumes evolved in the reducing reaction in order to collect therefrom the fines and condensed vapors entrained in the air stream arising from the reducing retorts. An example of the apparatus which has been employed heretofore to effect such filtering is shown in the McCrery Patent No. 1,928,670. As shown in said patent, the apparatus includes a filter chamber having a plurality of filter bags suspended therein. The chamber has an inlet communicating with the outside of the bags and an outlet communicating with the inside thereof. Particles entrained with the entering air deposit on the exterior of the bags, the air passing through the material of which the bags are made and thence to the outlet. A hopper for collecting the dust is disposed below the filter bags. In certain applications of apparatus such as that shown in the McCrery patent, difficulty has been experienced in removing from the filter bags the particles deposited thereon. Frequently the deposited particles are of such character that attempts to remove them by shaking the bags merely creates clouds of fine particles which are redeposited on the bags instead of falling to the hopper at the bottom of the filter chamber. The difficulty of removal may be due to quite different causes. For example, it is found upon examination of the deposit on filter bags of dust containing chloride of zinc, that the material on the filter surfaces at temperatures actually met with in practice is a pasty mass very difficult to remove, the pasty condition being due to the formation of a hydrate of zinc chloride including with each molecule of the salt, one or two molecules of water. I have discovered that removal of this material may be facilitated by changing it from a pasty mass to a crusty or flocculent state by the addition of more water, in which changed state it is more readily removed.

I have invented a novel method of removing from a filter material deposited thereon from a fluid stream passing through the filter. It is particularly useful in connection with materials such as zinc chloride, which are highly hygroscopic, but has numerous other applications which will be apparent from the following description. To facilitate removal of the deposited material, I convert it from a form in which it is removable only with difficulty, into a different form which is easily detachable from the bags. For example, in the case of zinc chloride, after a deposit has accumulated on the filter surface I supply to the deposit enough water vapor to change it from the pasty to the flocculent state. This change of state is immediately followed by removal, the excess water vapor not being applied continuously, but only for such short periods of time as required for the purpose of cleaning.

The water vapor may be supplied in the form of steam blown into the space between the bags; or it may be in the form of steam mixed with air; or it may be merely the water vapor present in compressed air without the use of steam. As volumes of dust laden gases which pass through the filters are usually large in comparison with the volume of dust after removal, a comparatively small amount of water carrying gas introduced intermittently is sufficient to accomplish the desired result.

The velocity at which the moisture laden air is blown past or upon the filter surfaces may suffice for mechanical removal.

I have also invented a novel apparatus for carrying out the method which includes a nozzle manifold mounted for traversing movement back and forth along a row of filter bags with connections extending from the manifold to a source of water vapor.

The following detailed explanation of the invention and description of the apparatus refers to the accompanying drawing illustrating the preferred form of the apparatus. In the drawing.

Figure 1:
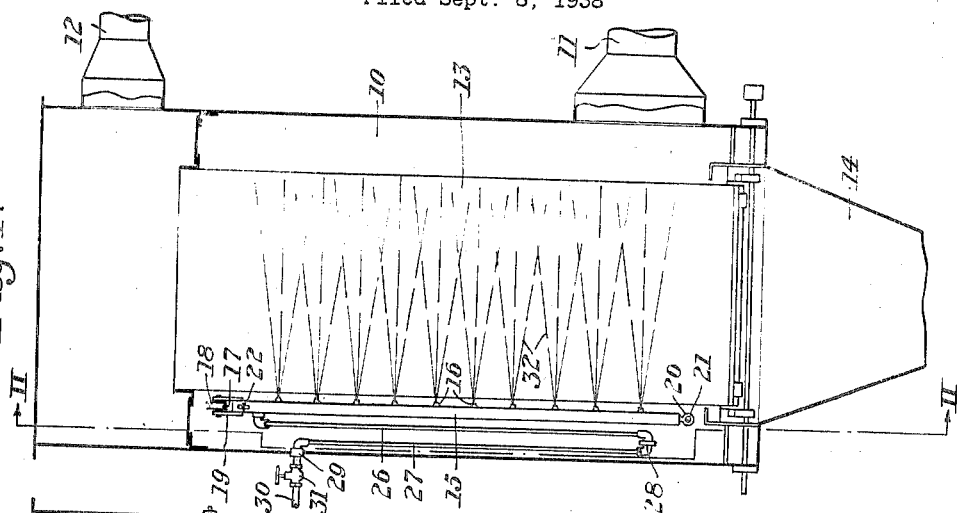
Figure 1 is a transverse sectional view taken through a filter chamber embodying the invention.
Figure 2:
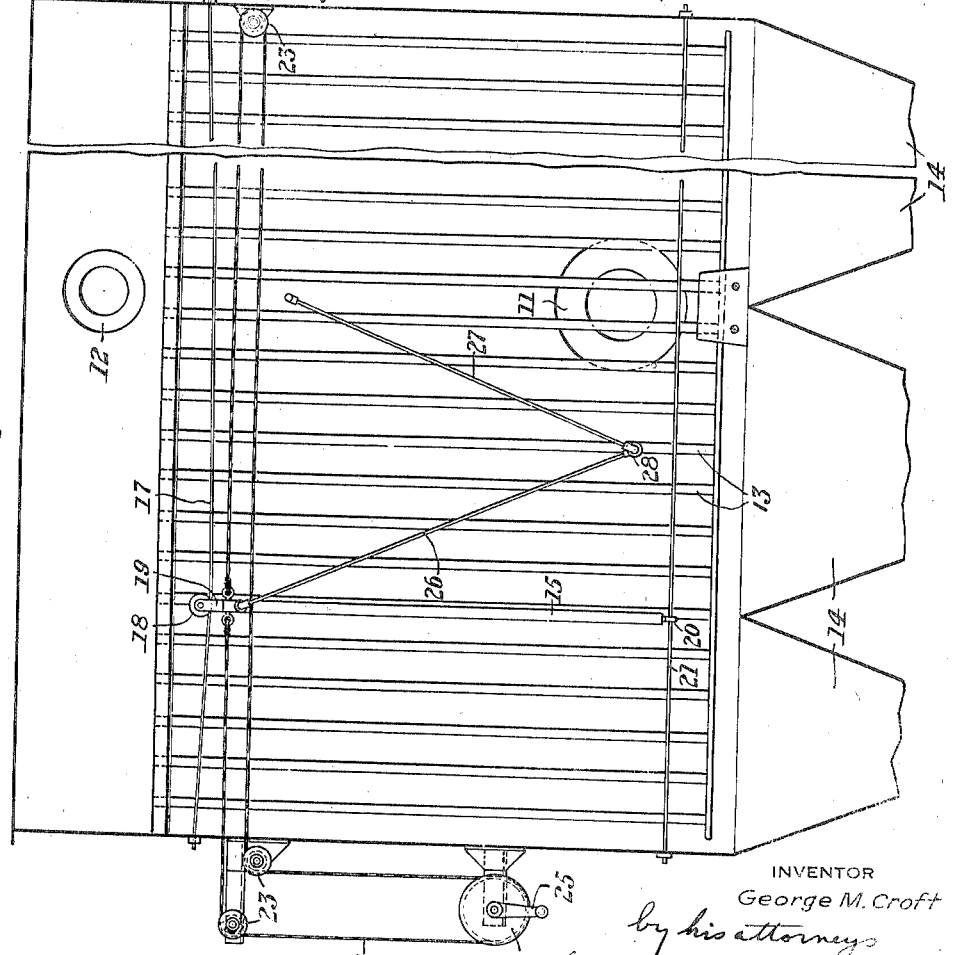
Figure 2 is a longitudinal sectional view taken along the line II—II of Figure 1. The line I—I of Figure 2 indicates the plane on which the section of Figure 1 is taken.

Referring now in detail to the drawing, a filter chamber 10 is defined by sheet metal side walls, top and bottom, mounted on suitable frame members (not shown). An inlet 11 is connected to the chamber adjacent the bottom thereof and an outlet 12 adjacent the top. A plurality of filter bags 13 are mounted in the chamber in a row on suitable supporting frames (not shown), conveniently in the manner more fully illustrated and described in said McCrery Patent No. 1,928,670. It will suffice to state here that the bags are closed at their bottoms and open at their tops, whereby dust-laden gases entering the chamber from the inlet 11 pass through the bags and depart through the outlet 12, the solid particles entrained with the entering gases being deposited on the outside of the bags. Hoppers 14 below the bags 13 collect the material which falls therefrom after being deposited.

The apparatus for performing the method of my invention in a filter chamber such as that above described comprises, in a preferred form, a nozzle manifold 15. The manifold 15 is provided with nozzles 16 spaced therealong. The manifold is mounted for traversing movement along the filter chamber on a trolley wire 17 by means of a trolley wheel 18, journaled in a bracket 19, secured to the upper end of the manifold. The manifold is provided at its lower end with an eye 20, through which passes a guide wire 21.

The manifold 15 is adapted to be actuated along the filter chamber by cable 22 traversing guide pulleys 23 and a driving pulley 24. The pulley 24 may conveniently be driven by a hand crank 25. The ends of the cable are attached to the manifold adjacent the bracket 19, whereby rotation of the pulley 24 in opposite directions causes the manifold to travel back and forth along the filter chamber.

Pipes 26 and 27 having a swiveled connection 28 are connected to the manifold 15 and a fixed fitting 29, respectively, by swivel joints. From the fitting 29 a pipe 30 extends to any convenient source of water vapor under suitable pressure.

As a source of water vapor, I may utilize steam, but prefer to supply to the manifold 15 a mixture of steam and air, or compressed air with the water vapor normally present in atmospheric air.

The method of my invention will be explained by describing the operation of the apparatus already described. The explanation will refer to the removal of zinc compounds, but this is by way of illustration only, as other compounds may be similarly treated.

Under normal operating conditions, the gases entering the chamber 10 through the inlet 11 include a considerable volume of air as well as the fumes evolved in the ore reduction process. These fumes are usually at high temperature when discharged from the reducing retorts and cool progressively as they depart therefrom. The fumes include metallic vapors which are condensed by the cooling, forming solid particles which are borne along by the air stream. These particles are filtered out and deposited on the bags as the air and other gases pass therethrough.

The manifold is caused to traverse the length of the filter chamber periodically. A motor drive and automatic timing means for causing this movement may be provided to eliminate the necessity of a manual operation, if desired. Preferably, the manifold is not actuated along the filter chamber until dust-laden gases have been delivered to the chamber for a time sufficient to deposit a layer of particles of substantial thickness on the filter bags. When the manifold is operated along the filter chamber, a mixture of steam and air is admitted thereto under the control of suitable means, such as a valve 31. Jets 32 of air and water vapor are discharged by the nozzles 16 into the spaces between adjacent bags. Although the temperature of the gases undergoing filtration may be several hundred degrees higher, this introduction of colder air with water vapor reduces the temperature on the bag surface temporarily to a value low enough to allow the zinc chloride to take up five or six molecules of water for each molecule of chloride. This temperature is about 200° F. This hydrate forms a thin crust on the bags which is readily detachable therefrom in the form of flakes by shaking or otherwise agitating the bags, for example, by the means shown in the McCrery patent above referred to. The detached flakes being fairly dense and of considerable size fall quickly into the hopper 14 and collect there until discharged through suitable valves (not shown).

I have found that water-laden compressed air, injected at high velocity, has the effect of removing the deposits after their physical character is changed, as well as changing that character, so that the same mechanism suffices for both purposes, at least with some materials. It is important that the temperature of the material to be removed be maintained in the neighborhood of 200° F. as most of the water of the higher hydrate is lost at higher temperatures forming the lower hydrate containing only one or two molecules of water for each molecule of zinc chloride, which is in the form of a pasty mass and is removable from the filter bags only with great difficulty.

While the dust collected from the gases evolved in the reduction of zinc ore includes zinc oxide, zinc sulphate and zinc oxychloride, as well as zinc chloride, such other compounds are removed from the filter bags with the higher hydrate of zinc chloride. The precise behavior of the oxide, oxychloride, and sulphate is not known, but these materials are apparently removed because they are intermixed with the hydrate of the chloride. In some cases, it has been found that the deposited material when converted to the form of a thin crust flakes off practically simultaneously with its conversion to that form.

It is not necessary that the entire filter chamber be continuously maintained at the temperature at which the higher hydrate is formed. The temperature of the gases undergoing filtration is not necessarily lowered for filtration purposes. Considerations of economy frequently require that the filtration itself be conducted with as little lowering of temperature as practicable. While the higher hydrate will not be formed unless the temperature is sufficiently reduced by operation of the nozzle manifold, this need only be done during the time when the deposited material is being removed, i. e., once every several minutes or hours depending on the amount of dust entrained with the air and other gases.

It will be understood, furthermore, that while the invention has been described in connection with the recovery of zinc compounds from the gases evolved in the reduction of zinc ore, it is also applicable to the recovery of compounds of other metals or any compounds which are hygroscopic or have other characteristics similar to those of zinc chloride, i. e., the formation of a hydrate in the form of a crust, even though the change in the character of the material is not so great as in the case of zinc chloride, or even to cases where no true chemical action occurs. The invention may be applied, for example, to cases where the material collecting on the filter bags, while not acquiring a pasty or sticky composition, is difficult to dislodge because of its finely divided dusty character and its tendency to form clouds and redeposit on the bags when the latter are agitated instead of falling into the collecting hoppers. Such dusts may be caused to form crusts which flake off easily instead of being reduced to dust on removal, by the introduction of sufficient water vapor.

While I have illustrated and described but a preferred practice and embodiment of the invention, it will be understood that changes in the procedure and construction disclosed herein may be made without departing from the spirit of the invention or the scope of the appended claims.

I claim:

1. In a method of removing from a filter fine particles of a compound subject to hydration, the steps including supplying water vapor in the neighborhood of said filter in an amount sufficient to hydrate said dust and thereby convert it into a crust which will flake readily from the filter.

2. In a method of removing from an air-permeable filtering fabric, particles of a compound subject to hydration, the steps including supplying water vapor in the neighborhood of said fabric in an amount sufficient to hydrate said dust and convert it into a crust which will flake readily from the fabric.

3. In a method of removing a deposit of a compound subject to hydration from a filter, the steps including periodically supplying water vapor in the neighborhood of said filter in an amount sufficient to hydrate said deposit and thereby convert it into a crust which will flake readily from said filter.

4. In a method of periodically removing from the surface of a filter, material deposited thereon from a gas at a temperature substantially above 200° F., which material is converted from a finely divided state into a flocculent crust by a limited amount of water, the steps of periodically supplying to the said material deposited on the filter surface, water vapor in amount sufficient only to cool the accumulated filtrate and cause conversion thereof into a brittle or flocculent crust capable of mechanical removal without returning to a finely divided or dusty state, flexing the filter with the crust thereon, thereby flaking off the crust, and resuming filtration of said gas at elevated temperature.

5. In a method of removing particles of material borne on an air stream, which material is converted from a finely divided state into a flocculent crust by a limited amount of water, the steps including passing the stream through an air-permeable filter for a period sufficient to deposit a layer of particles of substantial thickness and then admitting to the filter a gas containing water vapor in an amount sufficient to convert said layer into brittle crust or flakes readily removable mechanically in coherent fragments much larger than the original gas-borne particles, flexing said filter with the crust thereon, thereby detaching said crust from the filter, and discontinuing the application of water vapor after an interval only long enough to effect conversion of the filtrate into the form of a crust without the formation of a mud or slurry.

GEORGE M. CROFT.